Patented Apr. 15, 1930

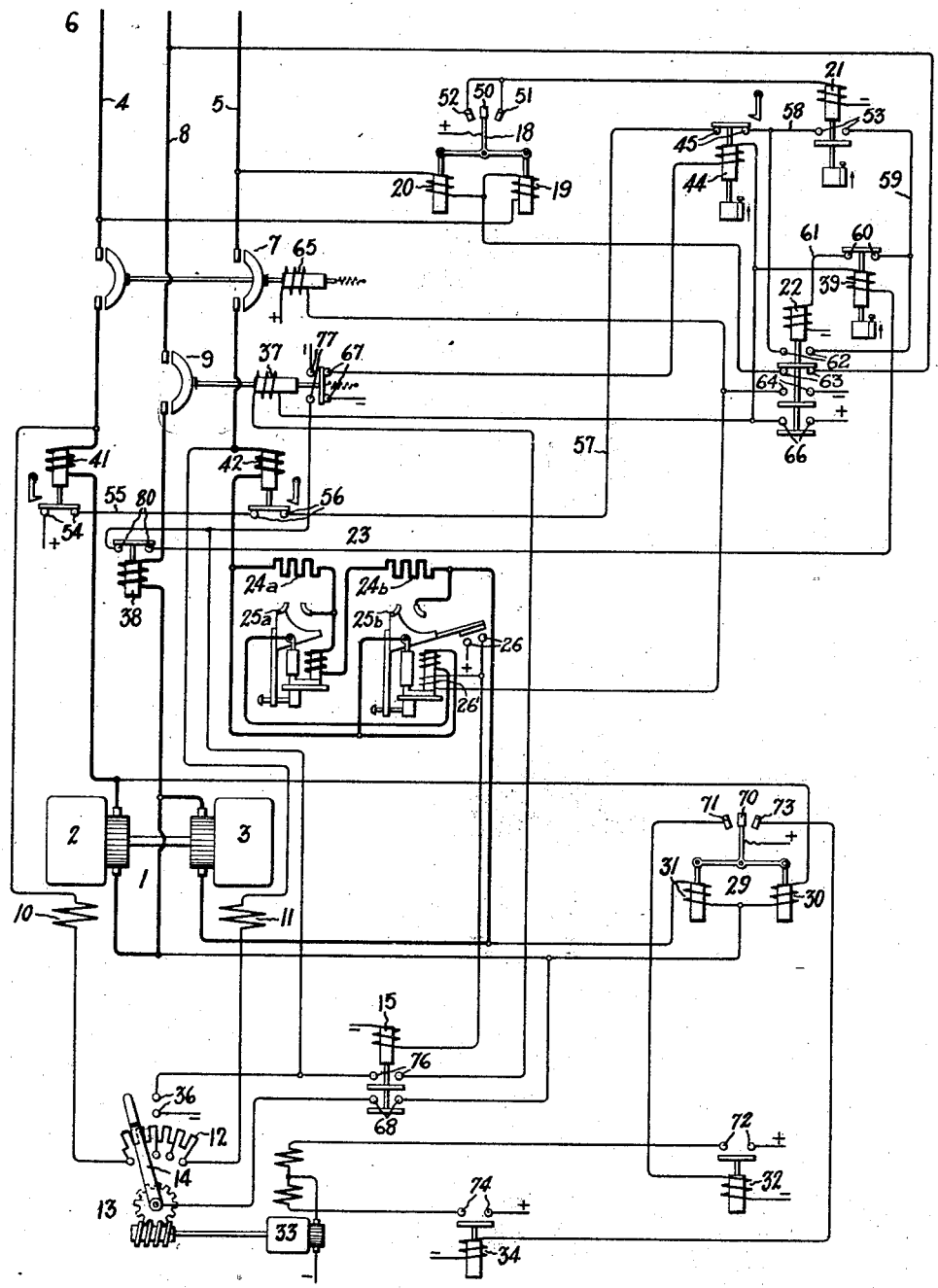

1,755,094

UNITED STATES PATENT OFFICE

HERMAN BANY AND HARRY E. LOCKETT, OF YEADON, PENNSYLVANIA, ASSIGNORS TO GENERAL ELECTRIC COMPANY, A CORPORATION OF NEW YORK

AUTOMATIC SWITCHING ARRANGEMENT

Application filed May 10, 1929. Serial No. 362,082.

Our invention relates to automatic switching arrangements and its object is to provide an arrangement for automatically starting a three wire balancer set and connecting it to a three wire direct current distribution system.

Our invention will be better understood from the following description when taken in connection with the accompanying drawing which shows diagrammatically a three wire balancer set control arrangement embodying our invention and its scope will be pointed out in the appended claims.

Referring to the drawing, 1 represents a three wire balancer set comprising two direct current machines 2 and 3 having their rotors mechanically connected together. The armature windings of the two machines are connected in series across the main terminals of the set which are arranged to be connected to the main conductors 4 and 5 of a three wire direct current circuit 6 by means of a suitable switch 7. The circuit 6 constitutes a portion of a three wire direct current system which is supplied by suitable sources of current, not shown. The neutral of the set 1 is arranged to be connected to the neutral conductor 8 of the circuit 6 by means of a suitable switch 9. The machines 2 and 3 are provided with the field windings 10 and 11 respectively which are connected in series with the resistor 12 of a motor operated rheostat 13 across the main terminals of the set 1, the resistor 12 being interposed between the two field windings 10 and 11 in the series circuit. The movable contact 14 of the rheostat is arranged to be connected to the neutral of the set 1 by means of a relay 15 so that the movement of the contact 14 effects simultaneous adjustments in the excitations of the two machines 2 and 3.

For effecting the starting of the set 1 we provide a voltage balance relay 18 comprising two opposing coils 19 and 20 which are respectively responsive to the voltages between the neutral conductor 8 and the two main conductors 4 and 5 of the circuit 6. When the circuit voltages are unbalanced, the relay 18 is arranged to complete an energizing circuit for a time relay 21, which after being energized for a predetermined time is arranged to effect the energization of a master relay 22 if the set is in an operative condition to be started.

The energization of the master relay 22 effects the closing of the switch 7 and the operation of a suitable automatic starting arrangement 23, examples of which are well known in the art, whereby the main terminals of the set 1 and a plurality of starting resistors $24^a$ and $24^b$ are connected in series across the main conductors 4 and 5 of the circuit 6 and as the starting current decreases, the starting resistors $24^a$ and $24^b$ are successively short-circuited by their respective short-circuiting switch $25^a$ and $25^b$. When the last starting resistor $24^b$ is short-circuited by its associated short-circuiting switch $25^b$ the auxiliary contacts 26 thereon are arranged to complete an energizing circuit for the relay 15 to connect the movable contact 14 of the rheostat 13 to the neutral of the set 1. The closing of the contacts 26 also completes a circuit for a holding winding 26' for the switch $25^b$ so that the switch remains closed independently of the current flowing through it.

After the automatic starting means 23 has completed its operation, the rheostat 13 is adjusted automatically to equalize the voltages of the two machines 2 and 3 of the set 1 and when the voltages are equal the closing of the neutral switch 9 is effected to connect the neutral of the set 1 to the neutral conductor 8 of the circuit 6. As shown in the drawing, we accomplish this result by providing a voltage differential relay 29 which has two opposing coils 30 and 31 respectively energized in response to the voltage across the machines 2 and 3 and which controls the operation of the rheostat 13 in response to the relative voltages of the two machines 2 and 3. When the voltage of the machine 2 exceeds the voltage of machine 3, the differential relay 29 completes a circuit for a control relay 32 which in turn completes an energizing circuit for the driving motor 33 for the rheostat 13 so that the movable contact 14 is moved in the proper direction to decrease the excitation of the machine 2 and increase the excitation of the machine 3. When the voltage of the machine 3 exceeds the voltage of the machine 2, the differential relay 29 completes an energizing circuit for a control relay 34 which in turn completes an energizing circuit for the driving motor 33 so that the movable contact 14 is moved in the proper direction to decrease the excitation of the machine 3 and increase the excitation of the machine 2.

In order to effect the closing of the neutral switch 9 when the voltages of the machines 2 and 3 are equal, the rheostat 13 is provided with auxiliary contacts 36, which are in an energizing circuit for the closing coil 37 of the switch 9 and which are arranged to be connected together by the movable member of the rheostat 13 when the member 14 is in the proper position to effect the desired relation between the voltages of the machines 2 and 3 before the switch 9 is closed.

The shutting down of the balancer set 1 is arranged to be effected in response to the current in the neutral connection of the set. We accomplish this result by providing a current relay 38 in series relation with the switch 9 and by arranging the relay 38 so that it completes an energizing circuit for a time relay 39 when the current flowing between the neutral of the set 1 and the neutral conductor 8 of the circuit 4 is below a predetermined value. The time relay 39 when energized a predetermined length of time effects the deenergization of the master relay 22.

The balancer set 1 is also arranged to be shut down when an excessive current flows through either of the machines 2 and 3.

We accomplish this result by providing the overcurrent relays 41 and 42 in series with the armature windings of the machines 2 and 3 respectively and arranging these relays so that they effect the deenergization of the master relay 22 when an abnormal current flows through the respective armature windings. Preferably the relays 41 and 42 are of the lockout type whereby they prevent the master relay 22 from being energized again after an abnormal current has flowed through one of the armature windings until the respective overcurrent relay has been manually reset.

We also provide a suitable timing relay 44 of the well known lockout type for effecting the shutting down of the balancer set 1 in case the starting operation thereof is not completed within a predetermined time. As shown, the relay 44 is arranged to be energized during the starting operation of the set when the master relay 22 is energized and to be deenergized when the neutral switch 9 is closed. The time setting of the relay 44 is such that normally sufficient time does not elapse between the energization of the master relay 22 and the closing of the switch 9 to allow the relay 44 to open its contacts 45 which are in the circuit of the master relay 22. If, however, the switch 9 is not closed within a predetermined time after the master relay 22 is energized, the lockout relay 44 opens its contacts 45 and deenergizes the master relay 22 so that the balancer set 1 is shut down and locked out until the lockout relay 44 is reset. Preferably, the relay 44 is arranged so that it has to be reset manually.

The operation of the arrangement shown in the drawing is as follows:

When the set 1 is shut down and the voltages of the circuit 6 become unbalanced the movable contact 50 of the voltage balance relay 18 engages either the contact 51 or the contact 52, depending on which voltage of the circuit 6 is the greater, and thereby completes an energizing circuit for the time relay 21. After a predetermined time the relay 21 closes its contacts 53 and completes an energizing circuit for the master relay 22. This circuit is from one side of a suitable control circuit through contacts 54 of overcurrent relay 41, conductor 55, contacts 56 of overcurrent relay 42, conductor 57, contacts 45 of lockout relay 44, conductor 58, contacts 53 of time relay 21, conductor 59, contacts 60 of relay 39, conductor 61, winding of master relay 22 to the other side of the control circuit. Relay 22 by closing its contacts 62, completes a locking circuit for itself which is independent of contacts 53 of the relay 21 so that the subsequent opening of these contacts 53 does not effect the deenergization of the master relay 22.

The master relay 22 by opening its contacts 63 disconnects the windings 19 and 20 of the relay 18 from the neutral conductor 8 of the circuit 6 so that the relay 18 assumes its mid position and effects the deenergization of the time relay 21 although the voltages of the circuit 6 are still unbalanced.

The master relay 22 by closing its contacts 64 completes an energizing circuit for the closing coil 65 of the switch 7 to effect the closing thereof so that machines 2 and 3 and the starting resistors $24^a$ and $24^b$ are connected in series across the conductors 4 and 5 of the circuit 6 to start the set.

The master relay 22 by closing its contacts 66 connects the winding of the timing lockout relay 44 and the auxiliary contacts 67 on the switch 9 in series across a suitable control circuit so that the relay 44 starts timing.

As the set accelerates and the starting current decreases, the automatic switches $25^a$ and $25^b$ of the automatic starting means 23 operate in a manner well known in the art to short-circuit the starting resistors $24^a$ and $24^b$ successively. When the operation of the automatic starting means is completed by the closing of the switch $25^b$, the auxiliary contacts 26 on the switch $25^b$ complete an energizing circuit for the holding winding 26' and also the control relay 15, which by closing its contacts 68 connects the movable contact 14 of the rheostat 13 to the neutral of the set 1. The circuit of the winding 26' also includes the contacts 64 of the master relay 22.

While the automatic switching means 23 is operating to effect the starting of the set 1, the voltages of the machines 2 and 3 are equal since the field windings 10 and 11 are connected in series and, therefore, are energized by the same current. Therefore, the relay 29 does not control the operation of the rheostat 13 during the operation of the automatic starting means 23. After the operation of the starting means 23 has been completed and relay 15 has effected the connection of the movable contact 14 of the rheostat 13 to the neutral of the set so that the excitations of the two machines may be different if the rheostat is not in its mid position, the voltage balance relay 29 then operates to control the rheostat 13 to equalize the voltages of the machines 2 and 3 if they are unequal. If the voltage of the machine 2 exceeds the voltage of the machine 3, the movable contact 70 of the relay 29 engages the contact 71 of the relay and completes an energizing circuit for the winding of the relay 32. The relay 32 by closing its contacts 72 completes an energizing circuit for the motor 33 so that the movable contact 14 of the rheostat 13 is moved in a direction to decrease the excitation of the machine 2 and to increase the excitation of the machine 3. If the voltage of the machine 2 is less than the voltage of the machine 3, the movable contact 70 of the relay 29 engages the contacts 73 of the relay and completes the energizing circuit for the winding of relay 34. The control relay 34 by closing its contacts 74 completes an energizing circuit for the motor 33 so that the movable contact 14 of the rheostat 13 is moved in a direction to decrease the excitation of the machine 3 and to increase the excitation of the machine 2.

When the rheostat 13 reaches its mid position the contacts 36 are closed and an energizing circuit is completed for the closing coil 37 of the neutral switch 9 to effect the connection of the neutral of the set to the neutral conductor 8 of the circuit 6. The energizing circuit of the closing coil 37 also includes the contacts 66 of the master relay 22 and the contacts 76 of the relay 15. The switch 9 by closing its auxiliary contacts 77 completes a locking circuit for its closing coil 37 which is independent of the contacts 36 on the rheostat 13 so that the subsequent opening of the contacts 36, when the rheostat 13 is being adjusted to balance the voltages of the circuit 6, does effect the opening of the switch 9. The switch 9 by opening its auxiliary contacts 67 opens the heretofore described circuit of the timing lockout relay 44 so that this relay cannot effect the shutting down of the set 1.

After the switch 9 closes, the relay 29 controls the operation of the rheostat 13 in the manner heretofore described so as to maintain the voltages of the circuit 6 balanced.

As long as the current in the neutral of the set 1 is above a predetermined value, the current relay 38, the winding of which is connected in series between the neutrals of the set 1 and the circuit 6 when the switch 9 is closed, maintain its contacts 80 open. When, however, the neutral current decreases to a predetermined value, thereby indicating that the load connected to the circuit 6 is substantially balanced, the relay 38 closes its contacts 80 and completes an energizing circuit for the time relay 39. This energizing circuit also includes the contacts 66 of the master relay 22 and the auxiliary contacts 77 on the switch 9 so that the stopping relay 39 can be energized only while the master relay 22 is energized and the neutral switch 9 is also closed. If the neutral current remains below a predetermined value for a predetermined time the time relay 39 opens its contacts 60 in the heretofore described circuit for the master relay 22. The deenergization of the master relay 22 effects the shutting down of the set 1 by opening the heretofore described circuits for the holding winding 26' and the closing coils 37 and 65 of the switches 9 and 7 respectively.

If the current flowing betwen the set 1 and the conductor 4 exceeds a predetermined value, the overcurrent relay 41 opens its contacts 54 in the heretofore described energizing circuit of the master relay 22 and effects the shutting down and locking out of the balancer set. In a similar manner, the overcurrent relay 42 opens its contacts 56 and effects the shutting down and locking out of the balance set when the current flowing between the set 1 and the conductor 5 exceeds a predetermined amount.

If the neutral breaker 7 remains open for any reason whatever for a predetermined time while the master relay 22 is energized, the lockout relay 44 opens its contacts 45 in the heretofore described energizing circuit of the master relay 22 and effects the shutting down and locking out of the set until the relay 44 is reset.

While we have, in accordance with the patent statutes, shown and described our invention as applied to a particular system and as embodying various devices diagrammatically indicated, changes and modifications will be obvious to those skilled in the art and we, therefore, aim in the appended claims to cover all such changes and modifications as fall within the true spirit and scope of our invention.

What we claim as new and desire to secure by Letters Patent of the United States, is:—

1. In combination, a three wire direct current circuit, a balancer set comprising two mechanically connected dynamo electric machines, automatic starting means for controlling the connections between the main conductors of said circuit and the main terminals of said machines in series so as to effect the starting of said set, means for effecting the operation of said starting means, and means for regulating the excitation of said set and for effecting the connection of the neutrals of said circuit and set together in response to a predetermined electric condition of said set after the operation of said starting means has been completed.

2. In combination, a three wire direct current circuit, a balancer set comprising two mechanically connected dynamo electric machines, automatic starting means for controlling the connections between the main conductors of said circuit and the main terminals of said machines in series so as to effect the starting of said set, means for effecting the operation of said starting means, means for regulating the relative excitation of said machines to produce a predetermined relation between the voltages thereof, and means responsive to a predetermined electrical condition of said set for effecting the connection of the neutral of said set to the neutral of said circuit.

3. In combination, a three wire direct current circuit, a balancer set comprising two mechanically connected dynamo electric machines, automatic starting means for controlling the connections between the main conductors of said circuit and the main terminal of said machines in series so as to effect the starting of said set, means for effecting the operation of said starting means, means for regulating the relative excitations of said machines to equalize the voltages thereof, and means for effecting the connection of the neutral of said circuit to the neutral of said set in response to a predetermined excitation condition of said machines.

4. In combination, a three wire direct current circuit, a balancer set comprising two mechanically connected dynamo electric machines, automatic starting means for controlling the connections between the main conductors of said circuit and main terminals of said machines in series so as to effect the starting of said set, means for effecting the operation of said starting means, and means for regulating the relative excitations of said machines to effect a predetermined electric condition of said set after the operation of said starting means has been completed.

5. In combination, a three wire direct current circuit, a balancer set comprising two mechanically connected dynamo electric machines having their armature windings connected in series and their field windings connected in series across the main terminals of the set, automatic starting means for controlling the connection between the main conductors of said circuit and the main terminals of said set, and means controlled by said automatic starting means for effecting a connection between said field windings and the neutral of said set after the operation of said automatic starting means has been completed whereby each field winding and its respective armature winding are connected in parallel with each other and in series with the shunt connected armature and field windings of the other machine.

6. In combination, a three wire direct current circuit, a balancer set comprising two mechanically connected dynamo electric machines having their armature windings connected in series and their field windings serially connected across the main terminals of the set, automatic starting means for controlling the connection between the main conductors of said circuit and the main terminals of the said set, means controlled by said automatic starting means for effecting a connection between said field windings and the neutral of said set after the operation of said automatic starting means has been completed whereby each field winding and its respective armature winding are connected in parallel with each other and in series with the shunt connected armature and field windings of the other machine, and means responsive to the voltages of said machines for varying the relative excitations of said shunt connected field windings so as to equalize the voltages of said machine.

7. In combination, a three wire direct current circuit, a balancer set comprising two mechanically connected dynamo electric machines having their armature windings connected in series and their field windings serially connected across the main terminals of the set, an adjustable rheostat having its resistor connected in series between said field windings and its movable contact connected to the neutral of said set, means for effecting the operation of said movable member to a predetermined position, and means controlled by said movable member when in said predetermined position for effecting the connection of the neutral of said circuit to the neutral of said set.

8. In combination, a three wire direct current circuit, a balancer set comprising two mechanically connected dynamo electric machines having their armature windings connected in series and their field windings serially connected across the main terminals of the set, an adjustable rheostat having its resistor connected in series between said field windings and its movable contact connected to the neutral of said set, means responsive to a predetermined condition of said set for effecting the operation of said movable member to a predetermined position, and means controlled by said movable member and said automatic starting means for effecting the connection of the neutral of said circuit to the neutral of said set when said movable member is in said predetermined position after the operation of said automatic switching means has been completed.

9. In combination, a three wire direct current circuit, a balancer set comprising two mechanically connected dynamo electric machines having their armature windings connected in series and their field windings connected in series across the main terminals of the set, an adjustable rheostat having its resistor connected in series between said field windings and its movable contact connected to the neutral of said set, means for effecting the operation of said movable member to effect a predetermined electric condition of said set after the operation of said automatic starting means has been completed, and means for effecting the connection of the neutral of said circuit to the neutral of said set when said electric condition is effected.

10. In combination, a three wire direct current circuit, a balancer set comprising two mechanically connected dynamo electric machines having their armature windings connected in series and their field windings connected in series across the main terminals of the set, an adjustable rheostat having its resistor connected in series between said field windings and its movable contact connected to the neutral of said set, means controlled by the relative voltages of said machines for effecting the operation of said movable member to effect a predetermined relation between the voltages of said machines, and means controlled by said movable member for effecting the connection of the neutral of said circuit to the neutral of said set when said movable member is in a predetermined position after the starting operation of said set has been effected by said automatic starting means.

11. In combination, a three wire direct current circuit, a balancer set, and means responsive to a predetermined unbalance of the voltages between the neutral and the two main conductors of said circuit for effecting the connection of said set to the main conductors of said circuit and the subsequent connection of the neutral of said set to the neutral of said circuit.

12. In combination, a three wire direct current circuit, a balancer set, means responsive to a predetermined unbalance of the voltages between the neutral and the two main conductors of said circuit for effecting the connection of said set to the main conductors of said circuit and the subsequent connection of the neutral of said set to the neutral of said circuit, and means responsive to the current in the neutral circuit of said set for effecting the disconnection of said set from said three wire circuit.

13. In combination, a three wire direct current circuit, a balancer set, means responsive to the predetermined unbalance voltage conditions of said circuit for effecting the connection of said set to the main conductors of said circuit and the subsequent connection of the neutral of said set to the neutral of said circuit; and timing means for effecting the disconnection of said set from said circuit if said neutral connection is not effected within a predetermined time.

14. In combination, a three wire direct current circuit, a balancer set, automatic starting means for controlling the connection of said set to the main conductors of said circuit and the subsequent connection of the neutral of said set to the neutral of said circuit, means for effecting the operation of said starting means, and timing means for effecting the disconnection of said set from said circuit and for preventing a subsequent operation of said starting means if said starting means does not effect the starting of said set within a predetermined time.

15. In combination, a three wire direct current circuit, a balancer set, means responsive to a predetermined electric condition of said circuit for effecting the connection of said set to the main conductors of said circuit and the subsequent connection of the neutral of said set to the neutral of said circuit, and means responsive to the current in the neutral circuit of said set for effecting the disconnection of said set from said circuit.

16. In combination, a three wire direct current circuit, a balancer set, means for connecting the main terminals of said set to the main conductors of said circuit, and means controlled by said connecting means for regulating the excitation of said set to equalize the voltages between the neutral of said set and the main terminals thereof.

17. In combination, a three wire direct current circuit, a balancer set, means for connecting the main terminals of said set to the main conductors of said circuit, means controlled by said connecting means for regulating the excitation of said set to equalize the voltages between the neutral of said set and the main terminals thereof, and means responsive to the equalization of said voltages for effecting the connection of the neutral of said set to the neutral of said system.

In witness whereof, we have hereunto set our hands this 8th day of May, 1929.

HERMAN BANY.
HARRY E. LOCKETT.